UNITED STATES PATENT OFFICE.

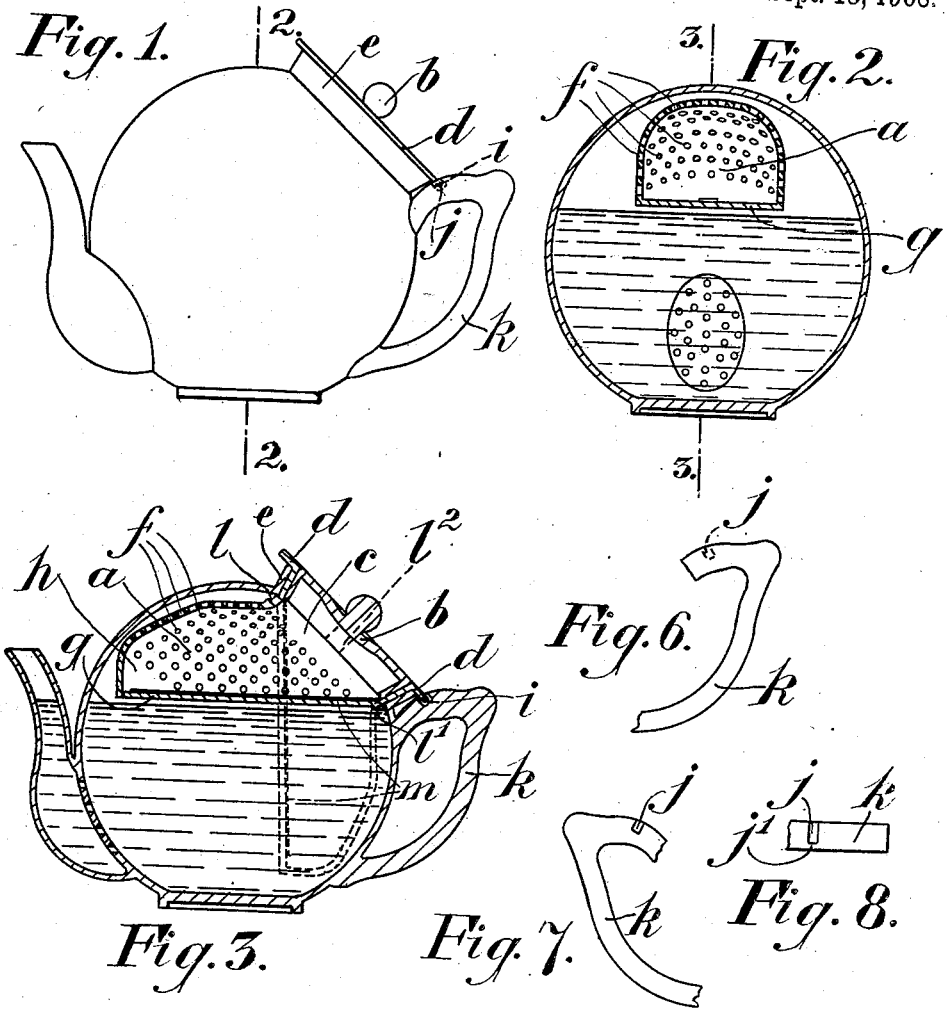

ARTHUR EDWARD WILSON, OF NEWLANDS, GLASGOW, SCOTLAND.

TEAPOT.

No. 898,713.  Specification of Letters Patent.  Patented Sept. 15, 1908.

Application filed November 9, 1907. Serial No. 401,511.

*To all whom it may concern:*

Be it known that I, ARTHUR EDWARD WILSON, a subject of the King of Great Britain, residing at Dechmont, Merrylee Road, Newlands, Glasgow, Scotland, have invented certain new and useful Improvements in Teapots, of which the following is a specification.

This invention relates to that class of teapots in which a holder or infuser is provided in the interior of the pot for the purpose of holding the tea to be infused, the holder being capable of being lowered into the water in order that the tea may be infused, and of being raised out of the water when the infusion has taken place.

The object of my invention is to provide a tea pot with a holder or infuser so constructed that, by merely turning it through an angle, the tea can be either immersed in the water or withdrawn therefrom and this can be done without removing the infuser from the pot.

In order that the invention may be clearly understood, I have hereunto appended an explanatory sheet of drawings, whereon:—

Figure 1 is a side view of a tea pot fitted with my improved infuser. Fig. 2 is a sectional view taken on the line 2, 2, Fig. 1. Fig. 3 is a sectional view of the whole tea pot taken on the line 3, 3, Fig. 2. Fig. 4 is an enlarged longitudinal section of the infuser. Fig. 5 is a cross section on the line 4, 4, Fig. 4. Fig. 6 is a view of the handle showing the closed side of the recess therein. Fig. 7 is another view of the handle showing the open side of the recess therein. Fig. 8 is a plan of part of the handle showing the recess therein.

I make the tea pot with an opening in its upper part and into this opening the holder or infuser can be inserted in a similar manner to the usual tea pot lid. This holder or infuser $a$ is made preferably of a somewhat segmental form and is provided with a mouth or opening having a tapered neck or collar $c$ made with an annular flange or rim $d$ which rests on the tapered neck or rim $e$ of the mouth of the teapot. Fitted removably in the interior of the neck or collar $c$ of the infuser is an ordinary lid $b$ while the body of the infuser is made with perforations or openings $f$ and when it is turned, as shown in dotted lines at Fig. 3, this perforated part dips into the liquid which latter gains free access to the interior of the infuser through the perforations $f$ and infuses the tea therein.

When the infusion has been made the holder or infuser $a$ is simply turned, by means of its annular flange or rim $d$ through an angle of 180° thereby moving the infuser from the position represented by the dotted lines Fig. 3 to that represented by the full lines, thus removing the infuser from the liquid and preventing further infusion of the tea.

There are no holes on the flat underside $g$ of the tea holder so that when the infuser is turned up out of the liquid the drippings from the leaves may not so readily find their way into the infusion. As a further safeguard to prevent the leaves coming again into contact with the infusion when the pot is tilted in the act of pouring out the tea, I arrange that there are no holes on the nose part $h$.

The lid $b$ of the holder or infuser $a$ may, if so desired, be hinged thereto, or the lid may be made with a projection (or projections) which fits (or fit) into a groove (or grooves) or equivalent formed in the neck or collar $c$ of the infuser; or, if desired, the groove or grooves may be made in the lid and the projection or projections on the neck or collar $c$, the infuser being capable, with either of these arrangements, of being turned round by means of the knob or handle of the lid.

The holder or infuser can be readily withdrawn, when desired, from the tea pot or receptacle.

It will be seen that the device is extremely convenient as the tea can be infused and then the infuser taken out of the water without withdrawing it from the pot as usual, a mere turn of the infuser being sufficient to effect this. As a gage to indicate the proper positions for the infuser I may provide a projecting part $i$ on the infuser or holder rim $d$ and this projection when the holder is in the raised up position, enters a groove or slot $j$ made in the handle $k$. This projection $i$ also serves as a safeguard to retain the holder $a$ in position and if desired the slot $j$ may have a closed end or stop $j^1$ to prevent the infuser or holder being turned through a greater angle than 180°, thereby insuring a uniform adjustment of the position of the holder. The stop might also, if desired, be arranged on the projecting part $i$.

Projections or catches $l$, $l^1$, are provided to assist in keeping the infuser in position and to guide the same when it is being turned up or down.

A scale m may be provided in the interior of the holder to indicate the amount of liquid in the pot, at various levels.

Of course the shape of the pot may be varied considerably from that shown in the drawing, so long as the rotary motion of the infuser is not interfered with. I prefer a globular pot and with such a pot I use a somewhat segmental shaped infuser.

Having now fully described my invention what I claim and desire to secure by Letters Patent is:—

1. The combination with a tea pot, of a turnable and removable infuser fitted in the mouth of the tea pot and projecting into the interior thereof, said infuser being mounted directly on the neck of the pot and capable of being turned through an angle into either a horizontal or vertical position within the pot without removal from the pot.

2. The combination with a tea pot having a mouth at the upper side thereof and at an incline, of a turnable and removable infuser fitted in the mouth of the tea pot and projecting into the interior thereof, said infuser being mounted directly on the neck of the pot and capable of being turned through an angle into either a horizontal or a vertical position within the pot without removal from the pot.

3. The combination with a tea pot, of a turnable and removable infuser which at one end is circular and adapted to fit in the mouth of the pot and at the other end is of segmental shape, said infuser being mounted directly on the neck of the pot and capable of being turned through an angle into either a horizontal or vertical position within the pot without removal therefrom.

4. The combination with a tea pot having a mouth at the upper side thereof which is inclined, of an infuser mounted directly on the neck of the pot and of segmental shape at its inner end and circular at its outer end so as to fit in the mouth of the pot, a lid for said infuser, and means whereby the infuser can be turned through an angle of 180° while in the pot.

5. The combination with a tea pot having a conically shaped mouth, of an infuser of angled shape having a conically shaped neck adapted to fit in said mouth, said infuser being curved at its upper side and flat on its lower side the upper side being perforated, and means whereby the infuser can be turned through an angle of 180°.

6. The combination with a tea pot having a mouth, and a rim, of an infuser of angular formation mounted directly on said rim and adapted to fit removably and turnably in the mouth of said pot without removal of the infuser therefrom, said infuser having a flange at its mouth end and being of segmental shape.

7. The combination with a tea pot having a mouth, of an infuser removably and turnably fitted therein said infuser being of segmental shape and having a neck adapted to fit into the mouth of the pot which mouth is disposed at an incline, an external flange being made on the neck and a lid for the infuser which lid also serves as a lid for the pot.

8. In combination, a tea pot having a mouth of conical form therein, an infuser having a neck of conical form and adapted to fit in said mouth, the infuser being of segmental shape and angled relatively with its neck and mounted to be turned in said neck to bring the infuser either into a horizontal or vertical position, and a lid for the infuser.

9. In combination, a tea pot having a mouth of conical form, an infuser having a neck of conical form and adapted to fit in said mouth, the infuser being of segmental shape and angled relatively with its neck, an external flange on the infuser, projections ($l$, $l^1$) on the inner end of the neck of the infuser and a lid for the infuser, said lid being capable of turning the infuser.

10. In combination, a tea pot having a mouth of conical form, an infuser having a neck of conical form and adapted to fit in said mouth the infuser being of segmental shape and angled relatively with its neck, a lid for the infuser and which is adapted to engage and turn the same, a flange on the exterior of the infuser having a projection thereon, a handle on the tea pot with recesses on the upper side thereof, the projection on the flange being adapted to engage said recesses.

11. A tea pot having a mouth inclined with relation to a vertical line through the tea pot and an infuser having a portion fitted to said mouth and an angularly disposed perforated portion movable within the tea pot and turnable either into a horizontal or a vertical position without removal from the tea pot.

12. A teapot having a mouth inclined with relation to a vertical line through the tea pot and an infuser having a portion fitted to said mouth, an angularly disposed perforated portion movable within the tea pot and turnable either into a horizontal or a vertical position without removal from the tea pot, and a lid, said infuser being turnable also without removing the lid.

In testimony whereof I affix my signature in presence of two witnesses.

ARTHUR EDWARD WILSON.

Witnesses:
ALFRED MIDDLETON,
ROBERT THOMSON.